(12) United States Patent
Sin

(10) Patent No.: US 11,472,407 B2
(45) Date of Patent: Oct. 18, 2022

(54) VEHICLE, SERVER COMMUNICATING WITH THE SAME, AND METHOD OF CONTROLLING THE SAME

(71) Applicants: HYUNDAI MOTOR COMPANY, Seoul (KR); KIA MOTORS CORPORATION, Seoul (KR)

(72) Inventor: Geunok Sin, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 453 days.

(21) Appl. No.: 16/561,988

(22) Filed: Sep. 5, 2019

(65) Prior Publication Data

US 2020/0189585 A1    Jun. 18, 2020

(30) Foreign Application Priority Data

Dec. 14, 2018    (KR) .................. 10-2018-0161568

(51) Int. Cl.
  *B60W 30/14*       (2006.01)
  *B60W 10/20*       (2006.01)
          (Continued)

(52) U.S. Cl.
  CPC ............ *B60W 30/14* (2013.01); *B60W 10/04* (2013.01); *B60W 10/18* (2013.01); *B60W 10/20* (2013.01);
          (Continued)

(58) Field of Classification Search
  CPC ...... B60W 30/14; B60W 10/04; B60W 10/18; B60W 10/20; B60W 50/14; B60W 2050/146; B60W 2420/42; B60W 2520/10; B60W 2530/209; B60W 2556/45; B60W 2710/06; B60W 2710/18; B60W 2710/20; B60W 60/001; B60W 40/09; B60W 2552/50; B60W 2555/20; B60W 30/165; B60W 40/06; B60W 40/105; B60W 60/0051; B60W 60/0053; B60W 2050/007; B60W 2050/143; B60W 2530/13; B60W 2540/10; B60W 2540/12; B60W 2540/18; G05D 1/0291; G05D 2201/0213;
          (Continued)

(56) References Cited

U.S. PATENT DOCUMENTS 9,355,423 B1 * 5/2016 Slusar .................. G08G 1/0112
9,390,451 B1 * 7/2016 Slusar .................... G06Q 40/08
          (Continued)

FOREIGN PATENT DOCUMENTS

EP          3053156          8/2016
WO   WO2015/047182 A1    4/2015

*Primary Examiner* — Dale W Hilgendorf
(74) *Attorney, Agent, or Firm* — Slater Matsil, LLP

(57) ABSTRACT

Disclosed are a vehicle, a server communicating with the vehicle, and a method for controlling the vehicle to communicate with the server and a second vehicle. The vehicle may include a communicator configured to communicate with the server and the second vehicle; a storage configured to store an application for a group driving mode with the second vehicle; and a controller configured to control the application when the group driving mode is selected and to exchange compensation for a service corresponding to the group driving mode with digital assets through the server.

17 Claims, 10 Drawing Sheets

(51) Int. Cl.
*B60W 10/18* (2012.01)
*B60W 10/04* (2006.01)
*B60W 50/14* (2020.01)
*G05D 1/02* (2020.01)
*G08G 1/00* (2006.01)
*H04W 4/44* (2018.01)
*H04W 4/46* (2018.01)

(52) U.S. Cl.
CPC ............ *B60W 50/14* (2013.01); *G05D 1/0291* (2013.01); *G08G 1/22* (2013.01); *H04W 4/44* (2018.02); *H04W 4/46* (2018.02); *B60T 2220/04* (2013.01); *B60W 2050/146* (2013.01); *B60W 2420/42* (2013.01); *B60W 2520/10* (2013.01); *B60W 2530/209* (2020.02); *B60W 2556/45* (2020.02); *B60W 2710/06* (2013.01); *B60W 2710/18* (2013.01); *B60W 2710/20* (2013.01); *G05D 2201/0213* (2013.01)

(58) Field of Classification Search
CPC ............ G05D 1/0223; G05D 1/0259; G05D 2201/0212; G08G 1/096791; G08G 1/22; G08G 1/096725; G08G 1/096838; G08G 1/0968; H04W 4/44; H04W 4/46; B60K 26/021; B60K 35/00; B60R 21/0134; B60T 7/042; B60T 2220/04; B60Y 2400/303

See application file for complete search history.

(56) References Cited

U.S. PATENT DOCUMENTS

| | | | |
|---|---|---|---|
| 9,645,579 B2* | 5/2017 | Switkes | B60W 30/165 |
| 9,927,816 B2* | 3/2018 | Li | B60K 31/00 |
| 10,029,696 B1* | 7/2018 | Ferguson | B60W 40/09 |
| 10,304,334 B2* | 5/2019 | Okabe | G08G 1/0112 |
| 10,520,952 B1* | 12/2019 | Luckevich | B60W 10/18 |
| 10,732,645 B2 | 8/2020 | Switkes | G05D 1/0217 |
| 10,762,791 B2* | 9/2020 | Switkes | H04W 76/14 |
| 10,899,323 B2* | 1/2021 | Switkes | B60T 7/22 |
| 2017/0349176 A1* | 12/2017 | Alden | B60W 30/16 |
| 2018/0210464 A1* | 7/2018 | Switkes | B60W 50/16 |
| 2018/0211545 A1* | 7/2018 | Smartt | H04W 12/08 |
| 2018/0217610 A1* | 8/2018 | Schuh | B60W 30/00 |
| 2019/0179337 A1* | 6/2019 | Ji | G08G 1/22 |
| 2019/0392091 A1* | 12/2019 | Kliemann | G06F 30/20 |
| 2021/0263535 A1* | 8/2021 | Fendt | G05D 1/0242 |
| 2021/0382492 A1* | 12/2021 | Park | B60L 58/13 |

\* cited by examiner

FIG. 6A

- Xcient_2016 YEARS TYPE(8X4 Dump)

- DRIVING LEVEL: HIGH GRADE (POINTS)

- STARTING POINT: MISA (MISA REST STOP, DEPART WITHIN ONE HOUR)

- DESTINATION: DUKSO SAMPAE

- WAY POINT: NONE

- DRIVING TIME: 3 HOURS

- RUNNING STYLE: FUEL EFFICIENCY FOCUS

- CARGO TYPE: SAND

- TARGET FUEL EFFICIENCY: 4Km/L

- RUNNING PRICE: 30 H_Mileage

- NUMBER OF VEHICLES AVAILABLE: 2 VEHICLES

FIG. 6B

- Xcient_2018 YEARS
  TYPE(6X4 Dump)

- STARTING POINT: MISA
  (WITHIN 30 MINUTES)

- DESTINATION: WIRYE

- WAY POINT: NONE

- CARGO TYPE: STONE

- RUNNING PRICE:
  25 H_Mileage

VEHICLE, SERVER COMMUNICATING WITH THE SAME, AND METHOD OF CONTROLLING THE SAME

CROSS-REFERENCE TO RELATED APPLICATION(S)

The present application claims priority to and the benefit of Korean Patent Application No. 10-2018-0161568, filed on Dec. 14, 2018, which is incorporated by reference herein in its entirety.

TECHNICAL FIELD

The present disclosure relates to a vehicle, a terminal for communicating with the vehicle, and a method of controlling the vehicle for providing a service for group driving.

BACKGROUND

The statements in this section merely provide background information related to the present disclosure and may not constitute prior art.

When several vehicles run to the same destination, a group driving may be performed in which one vehicle drives to the destination manually and the remaining vehicles follow the one vehicle through autonomous running.

Such group driving is used when driving commercial vehicles, such as trucks, which are used for the transportation of goods or people.

In recent years, as technology of intelligent vehicles has become more sophisticated, group autonomous driving technology with which grouping several vehicles autonomously runs has been researched.

The intelligent vehicle is a vehicle that includes at least one of an ultrasonic sensor, an image sensor, a laser sensor, and a LiDAR sensor that may replace a person's view, and uses at least one sensor to collect information related to the running of the vehicle and automatically runs without a driver's operation while recognizing an object such as an obstacle at the front.

SUMMARY

The present disclosure provides a vehicle performing a group driving mode using an application, a server communicating with the vehicle, and a control method thereof.

The present disclosure also provides a vehicle that transmits driving information to the following vehicles when the vehicle is in a leading mode during a group driving and transmits vehicle information acquired during the group driving to a server when the group driving is completed, and carries out autonomous driving by receiving the driving information when the vehicle is in a following mode, and receives and outputs content information, and a control method thereof.

The present disclosure also provides a server for exchanging group driving services cost into digital assets.

Additional aspects of the present disclosure will be set forth in part in the description which follows and, in part, will be obvious from the description, or may be learned by practice of the present disclosure.

In some forms of the present disclosure, a vehicle includes: a communicator to communicate with a server and another vehicle; a storage to store an application for group driving with the other vehicle; and a controller to control execution of the application when a group driving mode is selected and exchange compensation for a service corresponding to the group driving mode to digital assets through the server.

The vehicle further includes: a fuel amount detector to detect a fuel amount and a speed detector to detect a running speed. The controller obtains a running distance based on the detected running speed from a starting point to a destination when the group driving mode is performed, obtains a fuel efficiency based on the obtained running distance and the detected fuel amount, and transmits the obtained fuel efficiency to the server in a case of a leading mode. The fuel efficiency is information for determining an exchange amount of digital assets.

The vehicle further includes a display and a sound output, wherein the controller transmits route information from a starting point to a destination to the server when the group driving mode is performed, receives at least one of road situation information, weather information and rest area information corresponding to the route information from the server in a case of a leading mode, and control the operation of at least one of the display and the sound output to output the received at least one information.

The vehicle further includes: a first pressing detector to detect a pressure applied to a brake pedal; a second pressing detector to detect a pressure applied to an accelerator pedal; a steering angle detector to detect a steering angle of a steering wheel; and a braking device, a power device, and a steering device, wherein the controller controls, in a case of a leading mode, at least one of the braking device, the power device, and the steering device based on the information detected by the first and second pressing detector and the steering angle detector.

The vehicle further includes: an image obtainer to obtain an image of a road; and a distance detector to detect a distance to an obstacle, wherein the controller controls, in a case of a following mode, autonomous driving based on the image of the road, the distance to the obstacle and the driving information transmitted from a leading vehicle.

The vehicle further includes an input, a display, and a sound output, wherein the controller receives, in a case of the following mode, information of the leading vehicle from the server, controls the operation of at least one of the display and the sound output to output the received information of the leading vehicle, and controls the communicator to transmit received approval information to the server when the approval information for performing the group driving with the leading vehicle is received through the input. The information of the leading vehicle includes identification information of the leading vehicle and evaluation information of the leading vehicle stored in the server.

The vehicle further includes an input wherein the controller determines, in a case of the following mode, whether or not the group driving mode has been terminated, receives evaluation information of the leading vehicle when it is determined that the group driving mode has been terminated, and controls the communicator to transmit the received evaluation information to the server.

The received evaluation information is information for determining an exchange amount of digital assets.

The vehicle further includes a display and a sound output, wherein the controller receives, in a case of the following mode, content information from the server, and controls the operation of at least one of the display and the sound output to output the received content information.

In some forms of the present disclosure, a server includes: a communicator to communicate with a plurality of vehicles; a storage to store an application for group driving; and a controller to transmit the application to the vehicles for the group driving, manage digital assets of drivers of the vehicles that use the stored application, control the storage to store evaluation information of a received leading vehicle when evaluation information on the leading vehicle among the vehicles requesting the group driving is received from a following vehicle, and control exchange of digital assets between the leading vehicle and the following vehicle.

The controller of the server matches a leading vehicle and a following vehicle based on information of starting points and destinations of the vehicles requesting the group driving, transmits information of the matched following vehicle to the leading vehicle, and transmits information of the matched leading vehicle to the following vehicle.

The controller of the server includes searches for, when information of the starting point and information of the destination are received from the leading vehicle, a plurality of routes based on the received information of the starting point and the received information of the destination, and controls the communicator to transmit the detected plurality of route information to the leading vehicle.

The controller of the server confirms, when position information is received from the leading vehicle, at least one of road situation information, weather information and rest area information based on the received position information, and controls the communicator to transmit at least one of the confirmed road situation information, weather information, and rest area information.

The controller of the server obtains, when a running distance from the starting point to the destination and a change amount of fuel are received from the leading vehicle, fuel efficiency of the leading vehicle based on the received running distance and change amount of the fuel, generates evaluation information of the leading vehicle based on the obtained fuel efficiency, and determines an exchange amount of the digital assets corresponding to the generated evaluation information.

The controller of the server receives fuel efficiency from the leading vehicle, receives evaluation information of the leading vehicle from the following vehicle, generates final evaluation information of the leading vehicle based on the fuel efficiency and the evaluation information, and determines an exchange amount of the digital assets corresponding to the generated final evaluation information.

The controller of the server controls an increase in the digital assets of the driver of the following vehicle when the evaluation information of the leading vehicle is received from the following vehicle.

The controller of the server receives driving information from the leading vehicle and the following vehicle when the group driving is completed, and controls to store the received driving information.

In some forms of the present disclosure, in a control method of a vehicle for performing communication with a server and another vehicle, the control method of the vehicle includes: transmitting leading request information, information of a starting point, and information of a destination to the server when a leading mode is selected in a group driving mode; transmitting information on a selected one of a plurality of received routes to the server when information on the plurality of routes is received from the server; performing manual driving while communicating with a following vehicle when the information of the following vehicle is received from the server; adjusting digital assets of the following vehicle through the server when the group driving is terminated; transmitting following request information, information of a starting point, and information of a destination to the server when a following mode is selected in the group driving mode; performing autonomous driving while communicating with a leading vehicle when the information of the leading vehicle is received from the server; and adjusting digital assets of the leading vehicle through the server when the group driving is terminated.

The control method of the vehicle further includes obtaining a running distance based on a detected running speed from a starting point to a destination when the group driving mode is performed, obtaining a fuel efficiency based on the obtained running distance and a detected fuel amount, and transmitting the obtained fuel efficiency to the server in a case of a leading mode; and receiving digital assets corresponding to the fuel efficiency from the server.

The control method of the vehicle further includes receiving at least one of road situation information, weather information, and rest area information corresponding to the selected route information from the server in a case of the leading mode; and outputting the received at least one information through at least one of a display and a sound output.

The control method of the vehicle further includes receiving content information from the server in a case of the following mode; and outputting the received content information through at least one of a display and a sound output.

The control method of the vehicle further includes receiving evaluation information of the leading vehicle when it is determined that the group driving mode has been terminated; transmitting the received evaluation information to the server; and receiving digital assets corresponding to the transmission of the evaluation information from the server.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6A and 6B illustrate exemplary information on a group driving of the vehicles in one form of the present disclosure.

Figure 1:
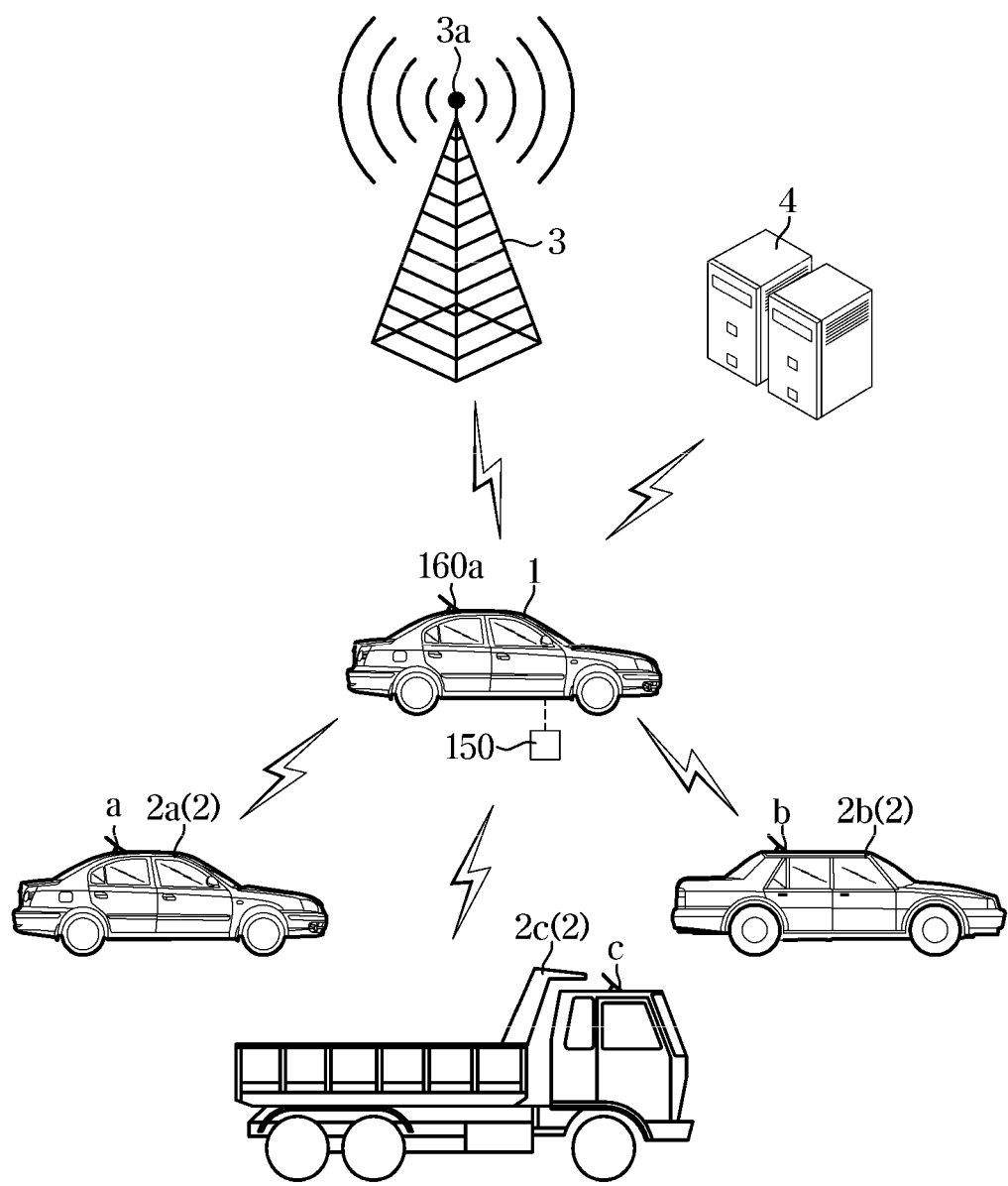
FIG. 1 is an exemplary diagram illustrating communication between vehicles in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter the present disclosure will be described in detail with reference to the accompanying drawings.

FIG. 1 is an exemplary diagram illustrating communication between vehicles in some forms of the present disclosure.

A vehicle is a machine that drives wheels for the purpose of transporting a person or a cargo, and moves on a road.

The vehicle may be classified into a passenger vehicle for personal use and for the purpose of movement and a commercial vehicle for commercial use and for the purpose of transporting goods or persons depending on its use.

The commercial vehicle may include a truck, a dump truck, a van, a forklift, and a special-purpose vehicle that transport goods, and may include a bus and a tax that transport people.

As illustrated in FIG. 1, a vehicle 1 (hereinafter referred to as 'own vehicle') may perform communication with at least one other vehicle 2 (2a, 2b, 2C) and communication with an infrastructure 3.

The own vehicle 1 may radiate electromagnetic waves to the outside through an antenna 160a.

In this case, the antenna 160a may emit an electromagnetic wave corresponding to the electrical signal transmitted from the controller 150 provided in the own vehicle 1.

The first other vehicle 2 (2a) may receive the electromagnetic wave, which has emitted through the antenna 160a of the own vehicle 1, through an antenna a. At this time, the first other vehicle 2a may receive the electromagnetic wave, which has emitted from the own vehicle 1, through the antenna a, convert the received electromagnetic wave into an electrical signal, and generate a control signal corresponding to the converted electrical signal to use the control signal for controlling the first other vehicle 2a.

The second other vehicle 2 (2b) may receive the electromagnetic wave, which has emitted through the antenna 160a of the own vehicle 1, through an antenna b. The second other vehicle 2b may also receive the electromagnetic wave, which has emitted from the own vehicle 1, through the antenna b, convert the received electromagnetic wave into an electrical signal, and generate a control signal corresponding to the converted electrical signal to use the control signal for controlling the second other vehicle 2b.

The third other vehicle 2 (2c) may also perform communication with the own vehicle 1 in the same manner as the first and second other vehicles 2a and 2b to use a generated control signal for controlling the third other vehicle 2c.

The first other vehicle 2a may generate an electrical signal based on the control signal transmitted from a controller (not shown) of the first other vehicle 2a through the antenna (a) and emit an electromagnetic wave corresponding to the electrical signal.

The second other vehicle 2b may also generate an electrical signal based on the control signal transmitted from a controller (not shown) of the second other vehicle 2b through the antenna (b) and emit an electromagnetic wave corresponding to the electrical signal.

At this time, the own vehicle 1 receives the electromagnetic wave emitted from at least one of the first other vehicle 2a, the second other vehicle 2b, and the third other vehicle 2c and converts the received electromagnetic wave into an electrical signal.

A drive module of the antenna 160a of the own vehicle 1 demodulates the received electromagnetic wave to convert it into an electrical signal, and transmits the electrical signal to the controller 150. At this time, the controller 150 of the own vehicle 1 generates a control signal corresponding to the converted electrical signal and uses the generated control signal for controlling the own vehicle 1.

The own vehicle 1 may perform communication (V2V communication) with at least one of the plurality of other vehicles 2a, 2b and 2c.

The own vehicle 1 may also receive the electromagnetic waves emitted from the infrastructure 3 on a road, or may emit electromagnetic waves to the infrastructure 3 on the road.

The infrastructure 3 performs communication based on a DSRC (Dedicated Short Range Communication) for communication with a vehicle and based on a wireless fidelity (Wi-Fi) communication. The infrastructure 3 may be a base station that performs communication based on the Wi-Fi communication.

The infrastructure 3 may receive the electromagnetic wave emitted from the antenna 160a of the own vehicle 1 through an antenna 3a, and use the electrical signal corresponding to the received electromagnetic wave to obtain information provided by the own vehicle 1 or generate a control signal.

The infrastructure 3 on the road transmits and receives a control signal to and from a server 4.

A controller of the infrastructure 3 may transmit an electrical signal, a control signal generated according to the electrical signal, or information acquired based on the electrical signal to the external server 4 or the like through a separate cable.

The controller of the infrastructure 3 may also cause to emit an electromagnetic wave corresponding to the generated control signal or information through the antenna 3a. A vehicle located in the vicinity of the infrastructure 3 may receive the electromagnetic wave emitted from the infrastructure 3.

That is, the infrastructure 3 may receive the electromagnetic wave emitted from the antenna 160a of the own vehicle 1 and transmit the electrical signal corresponding to the received electromagnetic wave to the server 4, and may convert an electrical signal received from the server 4 into an electromagnetic wave and then emit the converted electromagnetic wave.

At this time, the antenna 160a of the own vehicle 1 may receive the electromagnetic wave transmitted from the antenna 3a of the infrastructure 3, and the controller 150 of the own vehicle 1 may generate a control signal for various parts of the own vehicle 1, for example, a display of the own vehicle 1, based on the electric signal corresponding to the received electromagnetic wave to control the display of the own vehicle 1 so that information corresponding to the electrical signal is displayed through the display.

Accordingly, communication (V2I communication) between the own vehicle 1 and the infrastructure 3 (i.e., a structure) may be performed.

The server 4 provides a plurality of vehicles with information on various kinds for a group driving service. A group driving is called a platooning.

The server 4 receives traffic information, environmental information of roads and the like from the plurality of vehicles 1 and 2 and provides them to the plurality of vehicles 1 and 2. A description of the server 4 will be given later.

Each of the vehicles 1 and 2 may perform a function as a leading vehicle (LV) or a following vehicle (FV) when performing a group driving mode.

Each of the vehicles 1 and 2 may perform a leading mode when performing the function as the leading vehicle (LV) and may perform a following mode when performing the function as the following vehicle (FV).

Each of the vehicles 1 and 2 may perform only the function of the leading vehicle, only the function of the following vehicle, or both the functions of the leading vehicle and the following vehicle.

When each of the vehicles 1 and 2 may perform both the functions of the leading vehicle and the following vehicle, the functions may be determined according to a driver's choice.

When performing the group driving mode, the leading vehicle (LV) receives route information from the server 4, outputs the received route information, transmits driving information to the other vehicle 2 capable of autonomous driving, and manages the group.

When performing the group driving mode, the following vehicle (FV), which is a vehicle participating in the group through a series of procedures, receives the driving information transmitted from the leading vehicle (LV), receives the content information transmitted from the server 4, controls autonomous driving based on the received driving information, and outputs the received content information.

Figure 2:
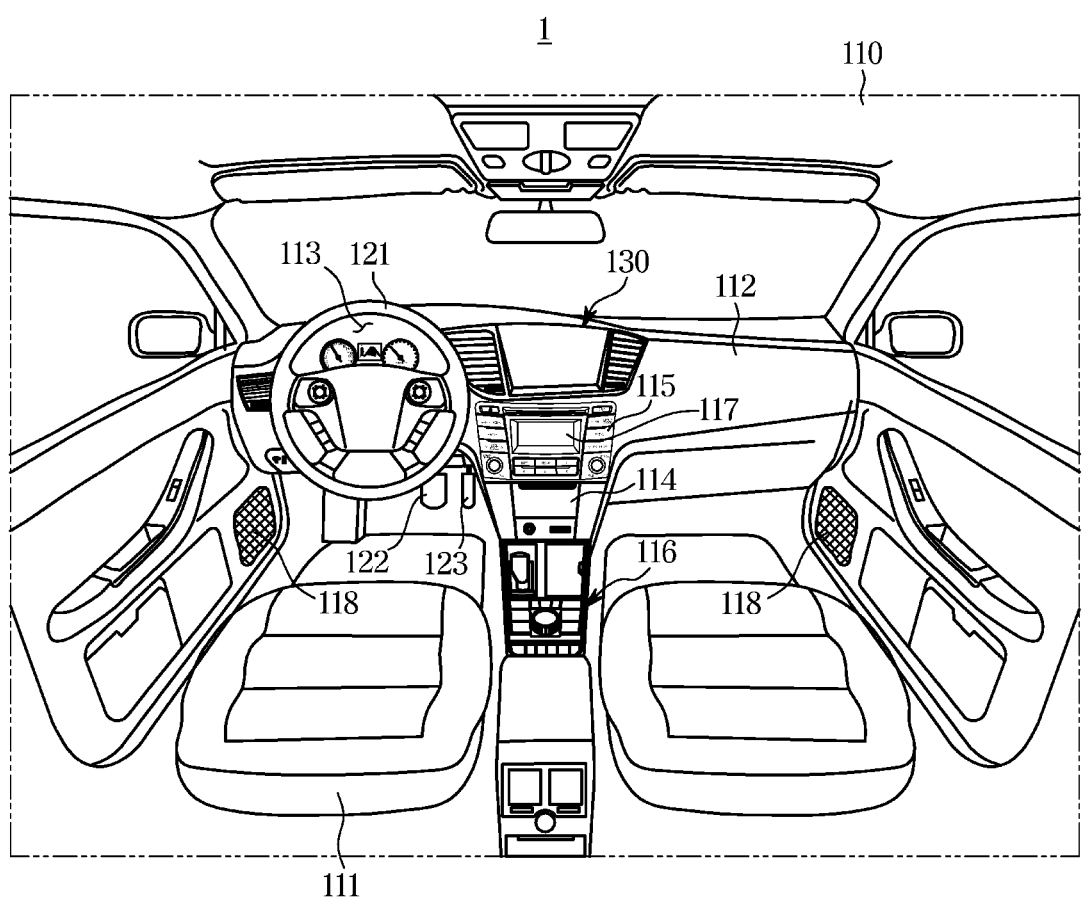
FIG. 2 is an exemplary view illustrating the inside of a passenger car among the vehicles in one form of the present disclosure.

FIG. 2 is an exemplary view illustrating the inside of a vehicle in some forms of the present disclosure.

As illustrated in FIG. 2, an interior 110 of a vehicle body includes seats 111 on which occupants sit, a dashboard 112, an instrument panel 113 (i.e., cluster) that is disposed on the dashboard 112 and provided with a tachometer, a speedometer, a coolant thermometer, a fuel meter, turn signal indicators, a high beam indicator light, a warning light, a seat belt warning light, an odometer, a hodometer, an automatic transmission selector indicator, a door open warning light, an engine oil warning light and a fuel shortage warning light, and a center fascia 114 on which an air outlet and a regulating plate of an air conditioner and an audio equipment are disposed.

The center fascia 114 may be provided with a head unit 115 for controlling the audio equipment, the air conditioner, and a heater.

The interior 110 of the vehicle body further includes an input 116 and a display 117 for interface with a user, and may further include a vehicle terminal 130.

The input 116 receives commands for the operation of various functions.

The input 116 may be provided on the head unit 115 and the center fascia 114.

The input 116 includes at least one physical button such as operation-on-off buttons of various functions, and buttons for changing setting values of various functions.

The input 116 may further include a jog dial (not shown) or a touch pad for inputting a movement command and a selection command of the cursor displayed on the vehicle terminal 130.

The display 117 is provided on at least one of the cluster 113 and the head unit 115 and displays information on the function that is being performed in the own vehicle 1 and information input by the user.

The own vehicle 1 may further include a sound output 118 for outputting a sound corresponding to the image displayed on the vehicle terminal 130, a sound output from a user terminal (not shown) when communicating with the user terminal, and a sound output through the head unit 115.

The sound output 118 may include a speaker.

The speaker converts an amplified low-frequency voice signal into the original sound wave, generates a dilatational wave in air, and copies the sound wave to output audio data as a sound that may be heard by the user.

The own vehicle 1 may include a steering wheel 121 of a steering device for adjusting the traveling direction, a brake pedal 122 to be pressed by the user according to the user's braking will, and an accelerator pedal 123 to be pressed by the user according to the user's acceleration will.

Also, the own vehicle 1 may selectively include electronic devices such as a hands-free device installed for the convenience of the driver, the audio equipment and a BLUETOOTH® device, a rear camera, a high pass device and the vehicle terminal 130.

The vehicle terminal 130 may include a display panel and may include a touch screen integrated with a touch panel on the display panel.

The vehicle terminal 130 performs an audio mode, a video mode, a navigation mode, a DMB (digital multimedia broadcasting) mode and a radio mode, and may display map information, route information, and route guidance information in the navigation mode.

When only the display panel is provided in the vehicle terminal 130, the button displayed on the vehicle terminal 130 may be selected using the input 116.

The vehicle terminal 130 may also display information on the function that is being performed and information inputted by the user and receive or display information on blind spots.

The vehicle terminal 130 may display images in the forward, backward, leftward, and rightward directions when the driving mode is an autonomous driving mode according to the group driving and may display the map information and the route guidance information in cooperation with the navigation mode.

The vehicle terminal 130 may receive information for performing the group driving mode and transmit the input information to the server 4, and may display information on the other vehicle 2 for the group driving.

The vehicle terminal 130 receives a selection command of the group driving mode.

The vehicle terminal 130 may also receive the selection of one of the leading mode and the following mode and receive the destination during the group driving mode.

Although FIG. 2 illustrates the interior 110 of the own vehicle 1, an interior of the other vehicle 2 may be the same as the interior 110 of the own vehicle 1.

Figure 3:
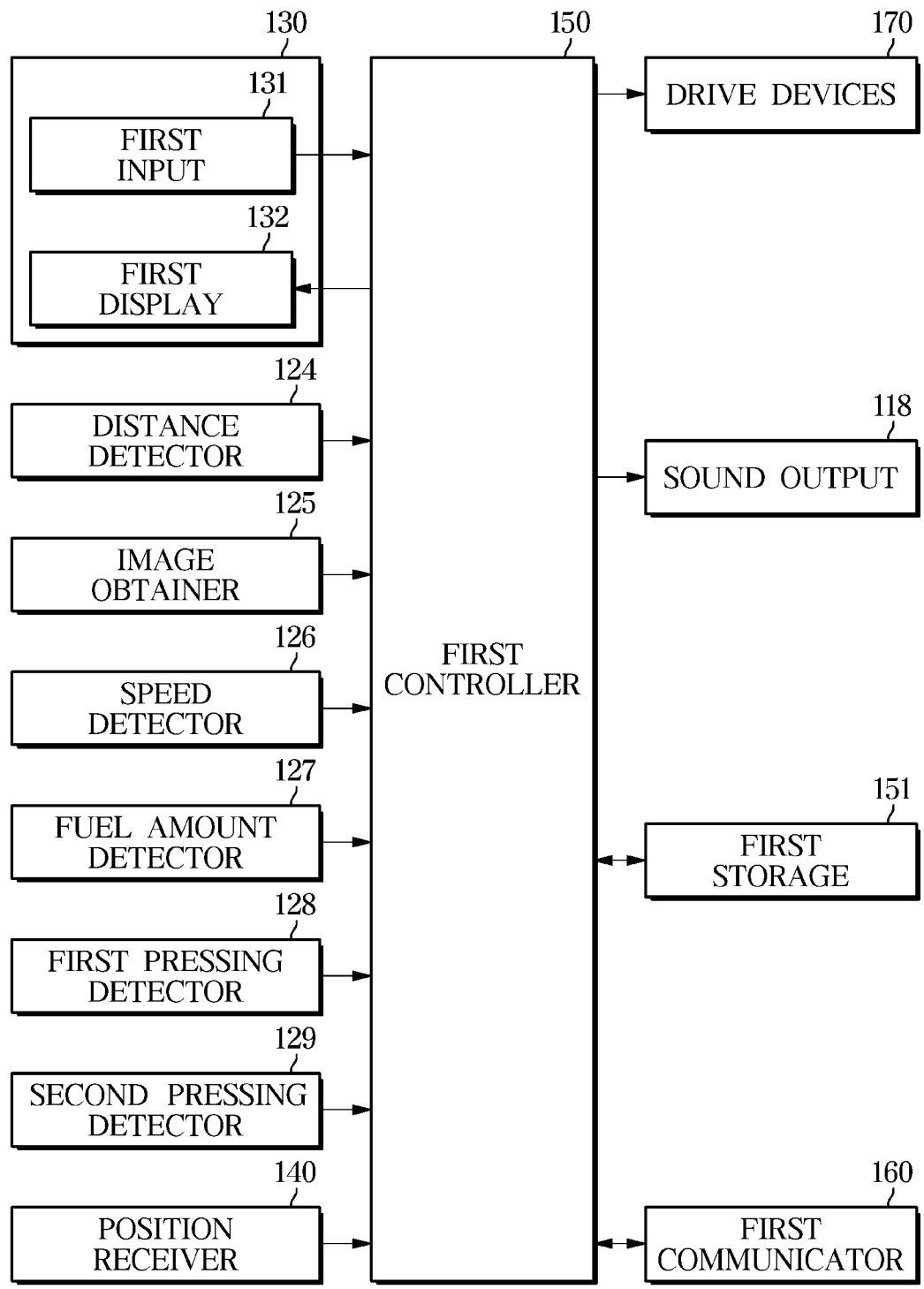
FIG. 3 is a control configuration diagram for a vehicle in one form of the present disclosure.

FIG. 3 is a control configuration diagram for a vehicle in some forms of the present disclosure. Although FIG. 3 illustrates the control configurations of the own vehicle 1, the other vehicle 2 may include the same control configurations as those of the own vehicle 1. Therefore, only the control configurations of the own vehicle 1 will be described below.

The own vehicle 1 includes a distance detector 124, an image obtainer 125, a speed detector 126, a fuel amount detector 127, a first pressing detector 128, a second pressing detector 129, the vehicle terminal 130, a position receiver 140, the first controller 150, a first storage 151, a first communicator 160, and drive devices 170, and further includes the sound output 118.

In order to distinguish the configurations of the own vehicle 1 from the configurations of the server 4, the term 'first' is given to the configuration of the own vehicle 1 having the same name as a configuration of the server 4, and the term 'second' is given to the configuration of the server 4.

When the own vehicle 1 may perform only the leading mode, the own vehicle 1 may not include the configurations related to the following mode, and when the own vehicle 1 may perform only the following mode, the own vehicle 1 may not include the configurations related to the leading mode.

Also, when the own vehicle 1 performs only the function of the leading vehicle (LV), the distance detector and the image obtainer of the configurations of the own vehicle 1 may be omitted, and when the own vehicle 1 performs only the function of the following vehicle (FV), the fuel amount detector and the position receiver of the configurations of the own vehicle 1 may be omitted.

Referring to FIG. 3, a case where the own vehicle 1 may perform both the leading mode and the following mode will be described.

The distance detector 124 detects a distance between the own vehicle 1 and a nearby vehicle, and a distance between the own vehicle 1 and an obstacle. The distance detector 124 may be provided on the front, rear, right, and left sides of the exterior 110 of the own vehicle 1, respectively.

The distance detector 124 includes a LiDAR sensor.

The LiDAR (Light Detection and Ranging) sensor is a non-contact type distance detection sensor using the principle of a laser radar.

The LiDAR sensor may include a transmitter for transmitting a laser and a receiver for receiving a laser beam reflected on a surface of an object existing within a sensor range.

The laser may be a single laser pulse.

The distance detector 124 may include an ultrasonic sensor or a radar sensor.

The ultrasonic sensor generates an ultrasonic wave for a certain time and then detects the signal reflected from an object.

The ultrasonic sensor may be used to determine the presence of an obstacle such as a pedestrian within a short range.

The radar sensor is a device that detects the position of an object by using reflected waves generated by the emission of radio waves when transmitting and receiving are performed in the same place.

The radar sensor uses the Doppler Effect or changes the frequency of a transmission radio wave in time or outputs a pulse wave as the transmission radio wave in order to prevent the transmitted radio wave and the received radio wave from being overlapped and difficult to distinguish.

Because the LiDAR sensor has higher detection accuracy in a lateral direction than the radar (Radio Detecting and Ranging) sensor, the LiDAR sensor may improve the accuracy of determining whether there is a passage in the front thereof.

The image obtainer 125 obtains an image of a road and transmits the obtained image to the controller 150. The image of the road may be an image of a road in a forward direction with respect to the running direction of the own vehicle 1.

The image obtainer 125, which is a camera, may include a CCD or a CMOS image sensor.

The image obtainer 125 may be provided on a front window glass inside the own vehicle 1, may be provided in a room mirror inside the own vehicle 1, or may be provided on a roof panel to be exposed to the outside.

The speed detector 126 detects a running speed of the own vehicle 1.

The speed detector 126 includes a plurality of wheel speed sensors for outputting detection information (I.e., wheel speed information) corresponding to the rotational speed of the wheels provided on the front, rear, right and left sides of the own vehicle 1.

The speed detector 126 may include an acceleration sensor for outputting detection information (i.e., acceleration information) corresponding to the acceleration of the own vehicle 1.

The speed detector 126 may include both the plurality of wheel speed sensors and the acceleration sensor.

The fuel efficiency of the own vehicle 1 may vary depending on the information on pressing of the accelerator pedal 123 and the brake pedal 122.

Therefore, the own vehicle 1 includes the fuel amount detector 127 for detecting information on the drivers intention to obtain the fuel efficiency information of the own vehicle 1, and may include the first and second pressing detectors 128 and 129.

The fuel amount detector 127 detects the amount of fuel in a fuel tank.

The fuel amount detector 127 may be a fuel weight detector for detecting a weight of a fuel or a level detector for detecting a height level of the fuel in the fuel tank.

The first and second pressing detectors 128 and 129 are detectors for detecting information corresponding to the drivers driving habit.

That is, the first pressing detector 128 outputs detection information (i.e., pressure information) corresponding to the pressure applied to the brake pedal 122.

The first pressing detector 128 may be provided on the brake pedal 122.

The first pressing detector 128 may detect the brake hydraulic pressure of a braking device.

The second pressing detector 129 is provided on the accelerator pedal 123 and outputs detection information (i.e., pressure information) corresponding to the pressure applied to the accelerator pedal 123.

The own vehicle 1 may further include a steering angle detector for detecting a steering angle of the steering wheel 121.

The vehicle terminal 130 receives information on an audio function, a video function, a DMB function, a radio function, the navigation mode, and the group driving mode, and displays operation information on a function or mode that is being performed.

A first input 131 of the vehicle terminal 130 receives the leading mode or the following mode during the group driving mode, may receive information on a destination in the group driving mode, and may receive information on a way point.

The first input 131 of the vehicle terminal 130 may receive selection information or approval information of the leading vehicle when the following mode is performed and may receive selection information or approval information of the following vehicle when performing the leading mode.

The first input 131 of the vehicle terminal 130 may receive route information on at least one of a plurality of routes.

The first input 131 of the vehicle terminal 130 may receive evaluation information of the leading vehicle.

A first display 132 of the vehicle terminal 130 may display information to be input by the user in the group driving mode. The information to be input by the user may include destination information, way point information, departure time information, leading mode or following mode information.

The first display 132 of the vehicle terminal 130 displays the route to the destination in the group driving mode, and may display rest area information, traffic information, road situation information, weather information, and the like.

The first display 132 of the vehicle terminal 130 may display content information when the following mode is performed during the group driving mode. The content information may include movies, music, news, advertisements, lectures, and the like.

The first display 132 of the vehicle terminal 130 displays map information and may display the map information matching the route and the route guidance information.

The first display 132 of the vehicle terminal 130 displays the traveling time and the traveling distance corresponding to each route when there are a plurality of routes to the destination.

The first display 132 of the vehicle terminal 130 may display a fuel amount, a traveling distance, and fuel efficiency.

In addition, the vehicle terminal 130 may a separate controller (not shown) for performing communication with the first controller 150 for controlling the group driving mode, transmitting the information input to the first input 131 to the first controller 150, and displaying the information transmitted from the first controller 150 on the first display 132.

The position receiver 140 receives the position information of the own vehicle 1 and transmits the received position information to the first controller 150.

The position receiver 140 may include a GPS (Global Positioning System) receiver for performing communication with a plurality of satellites to calculate the position of a vehicle.

The first controller 150 obtains the running speed of the own vehicle 1 based on the detection information output from the plurality of wheel speed sensors.

The first controller 150 may obtain the running speed of the own vehicle 1 based on the detection information output from the acceleration sensor.

The first controller 150 may obtain the running speed of the own vehicle 1 based on the detection information output from the plurality of wheel speed sensors and the detection information output from the acceleration sensor.

The first controller 150 may obtain the traveling distance of the own vehicle 1 based on the traveling time and the traveling speed of the own vehicle 1.

The first controller 150 may receive the traveling distance from a traveling recorder (not shown).

The first controller 150 may obtain the traveling distance based on the change information of the position provided from the GPS receiver and may obtain the traveling distance based on the navigation information of the vehicle terminal 130.

The first controller 150 obtains fuel efficiency information based on the traveling distance and the pressing information of the brake pedal 122 and the accelerator pedal 123 detected by the first and second pressing detectors, and controls the output of the obtained fuel efficiency information.

The first controller 150 controls the execution of an application for performing the group driving mode when the selection signal of the selected group driving mode is received through the first input 131 of the vehicle terminal 130. At this time, the first controller 150 may control the operation of the first display 132 to display the information of the executed application.

When the group driving mode is performed, the first controller 150 confirms the current position information received by the position receiver 140, confirms the information of the selected destination through the first input 131 of the vehicle terminal 130, and controls the first communicator 160 to transmit the current position information and the destination information to the server 4.

When the selection signal of the leading mode or the following mode to be performed by the own vehicle 1 is received, the first controller 150 transmits a mode selection signal to the server 4.

When performing the leading mode, the first controller 150 controls the display of the route information transmitted from the server 4, controls the first communicator 160 to transmit the route information selected by the user to the server 4, controls the operation of the first display 132 so that information of a received following vehicle is displayed when the information of the following vehicle is received from the server 4, and controls the first communicator 160 to transmit the approval information input through the first input 131 to the server 4.

When performing the following mode, the first controller 150 controls the display of the route information transmitted from the server 4, controls the operation of the first display 132 so that information of a received leading vehicle is displayed when the information of the leading vehicle is received from the server 4, and controls the first communicator 160 to transmit the approval information input through the first input 131 to the server 4.

The first controller 150 may control the output of the route information to the destination. That is, the first controller 150 generates navigation information to travel on the selected route and controls the output of the generated navigation information.

The first controller 150 may control the first display 132 to display the route from the current position to the destination in a state of matching the map, control the first display 132 to display the route guidance information from the current position to the destination, and at the same time control the operation of the sound output 118 to output the route guidance information as a sound.

The first controller 150 may control the operation of at least one of the first display 132 and the sound output 118 to output the road situation information, the state information of the following vehicle, the weather information, the rest area information, etc. received from the server 4 during the execution of the leading mode.

When performing the leading mode during the group driving mode, the first controller 150 controls the first communicator 160 to transmit the driving record information and the fuel amount information before entering the group driving mode to the server 4.

The first controller 150 regulates the speed of the own vehicle 1 by controlling a power device and the braking device based on the operation information of the brake pedal and the operation information of the accelerator pedal operated by the driver during the execution of the leading mode, and regulates the traveling direction of the own vehicle 1 by controlling the steering device based on the steering information of the steering wheel 121 operated by the driver.

When performing the leading mode, the first controller 150 may determine whether the group driving mode is completed, and may control the first communicator 160 to transmit the driving record information to the server 4 and to transmit the fuel amount information to the server 4 when it is determined that the group driving mode is completed.

The first controller 150 may store the information of an added fuel amount (that is, an refueling amount) when the amount of fuel increases due to refueling during the execution of the leading mode, and may transmit the information on the refueling amount to the server 4 when the group driving mode is completed.

The first controller 150 may transmit the fuel efficiency information input to the first input 131 to the server 4 when performing the leading mode. The fuel efficiency information may be information for determining an exchange amount of digital assets.

The fuel efficiency may be used as information for judging the value of the leading vehicle when using the service as the following vehicle.

The first controller 150 controls the first communicator 160 to transmit the driving information to the other vehicle 2 when performing the leading mode.

When performing the leading mode, the first controller 150 may determine whether the group driving mode is completed, and may control the operation of at least one of the first display 132 and the sound output 118 to request the server 4 for payment and output the information on the digital assets transmitted from the server 4 when it is determined that the group driving mode is completed. The digital assets are also referred to as digital tokens and may include virtual currency as block chain-based currency.

When performing the following mode, the first controller 150 controls the driving of the various drive devices 170 based on the driving information transmitted from the other vehicle 2 to allow the own vehicle 1 to autonomously drive from the current position to the destination.

The driving information may include a running direction, a running speed, a stop, braking information, and acceleration information.

When performing the following mode, the first controller 150 activates the operations of the image obtainer 125 and the distance detector 124.

When performing the following mode, the first controller 150 may confirm the positions of the obstacle and the other vehicle 2 running on the left and right lanes of the own vehicle lane based on the distance information on the obstacle detected by the distance detector 124, confirm the distances corresponding to the positions of the other vehicle 2 and the obstacle that are confirmed, and regulate the speed of the own vehicle 1 based on the distance between the other vehicle 2 and the obstacle that are confirmed.

The first controller 150 may control the operation of the first display 132 of the vehicle terminal 130 so that the location information of the obstacle is displayed.

The first controller 150 may recognize the lane of a road by performing the image processing when the image information of the road is received during the execution of the following mode, and may control the vehicle to recognize the lane based on the position information of the recognized lane and autonomously drive along the recognized lane.

The first controller 150 may cause the first display 132 to display images in the front, rear, left, and right directions of the own vehicle 1 obtained through the image obtainer 125 during the execution of the following mode, and may cause the first display 132 to display the map information matching the route and the route guidance information in cooperation with the navigation mode.

The navigation information includes destination information and map information, and further includes the name of the road in the map, the position information of the road, the type of the road, and the route number of the road.

When performing the following mode, the first controller 150 controls the output of the content information transmitted from the server 4. That is, the first controller 150 may control the operations of the first display 132 and the sound output 118 of the vehicle terminal 130 so that the content information is output.

When performing the following mode, the first controller 150 determines whether the group driving mode is completed, and controls the first communicator 160 to receive evaluation information about the leading vehicle and to transmit the received evaluation information to the server 4 when it is determined that the group driving mode is completed.

The evaluation information, which is information on driving habits and driving safety about the leading vehicle, may be information for determining the exchange amount of digital assets to be paid to the leading vehicle.

The first controller 150 may also perform a manual driving mode when the following mode is terminated. That is, the first controller 150 may control the power device and the braking device based on the operation information of the brake pedal and the operation information of the accelerator pedal operated by the driver during the execution of the manual driving mode, thereby regulating the speed of the vehicle, and may control the steering device based on the steering information of the steering wheel 121 operated by the driver, thereby regulating the running direction of the vehicle.

When the following mode is terminated, the first controller 150 receives cost information to be paid from the server 4, and at this time may pay for the group driving service using the digital assets of the user managed by the server 4.

The first controller 150 may be a controller provided in an autonomous driving device (not shown) for autonomous driving. The autonomous driving device is a device that controls autonomous driving of the vehicle based on input information of the first input 131, image information of the image obtainer 125, detection information of the distance detector 124 and the speed detector 126, and position information of the position receiver 140.

The first controller 150 may perform communication with the user terminal storing the application for executing the group driving mode.

The user terminal may transmit the inputted information to the server 4 when the information for the group driving is input through the application for executing the group driving mode and control to display information on the leading vehicle or the following vehicle transmitted from the server 4.

At this time, the first controller 150 may perform the group driving while communicating with the other vehicle (the leading vehicle or the following vehicle) transmitted from the user terminal.

The first controller 150 may transmit the driving information between the starting position and the arrival position to the server even when not performing the group driving mode, and may receive the cost information from the server 4.

When performing the following mode, the first controller 150 may change the leading vehicle at a way point based on the information of the starting point, the destination and the way point of the own vehicle 1 and the information of the starting point, the destination and the way point of the leading vehicle and may terminate the group driving mode at the way point.

When performing the leading mode, the first controller 150 may change the following vehicle at a way point based on the information of the starting point, the destination and the way point of the own vehicle 1 and the information of the starting point, the destination and the way point of the following vehicle or may terminate the group driving mode to the way point.

The first controller 150 may be implemented as a memory (not shown) for storing an algorithm for controlling the operation of components in a vehicle or data for a program reproducing the algorithm and a processor (not shown) for performing the above-described operations using data stored in the memory. In this case, the memory and the processor may each be implemented as separate chips. Alternatively, the memory and the processor may be implemented as a single chip.

The first storage 151 may store the map information.

The first storage 151 may store the fuel information.

The first storage 151 may store the application for performing the group driving mode. The application may be pre-stored or an application that is downloaded from the server 4.

The first storage 151 may be a memory implemented as a separate chip from the above-described processor with respect to the first controller 150, and may be implemented as a single chip with the processor.

The first storage 151 may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto.

The first communicator 160 includes the antenna 160a, and may communicate with the infrastructure 3 via the antenna 160a and receive the information transmitted from the infrastructure 4 through the server 4. That is, the first communicator 160 may communicate with the server 4 through the infrastructure 3 on the road.

The first communicator 160 performs communication with the server 4, the infrastructure 3 and the other vehicle 2.

The first communicator 160 transmits a control signal from the first controller 150 to the server 4 and transmits various kinds of information transmitted from the server 4 to the first controller 150.

The first communicator 160 transmits various kinds of information related to the group driving mode to the server 4.

The first communicator 160 may receive the content information from the server 4 and receive the route information to the destination.

The first communicator 160 may transmit the driving information of the first controller 150 to the other vehicle 2 that performs the group driving mode.

The first communicator 160 may also perform communication with the user terminal (not shown). In this case, the first communicator 160 may receive information related to the group driving mode from an application executed in the user terminal.

The first communicator 160 may include one or more components that enable communication with the first controller 150 and may, for example, include at least one of a short-range communication module, a wired communication module, and a wireless communication module.

The short-range communication module may include various short-range communication modules that transmit and receive signals using a wireless communication network in a short distance such as a BLUETOOTH® module, an infrared communication module, an RFID (Radio Frequency Identification) communication module, a WLAN (Wireless Local Access Network) communication module, an NFC communication module, and a ZIGBEE® communication module.

The wired communication module may include various wired communication modules such as a CAN (Controller Area Network) communication module, a LAN (Local Area Network) module, a WAN (Wide Area Network) module, or a VAN (Value Added Network) module, as well as various cable communication modules such as a USB (Universal Serial Bus), an HDMI (High Definition Multimedia Interface), a DVI (Digital Visual Interface), an RS-232 (recommended standard 232), power line communication, or a POTS (plain old telephone service).

The wired communication module may further include a LIN (Local Interconnect Network).

The wireless communication module, in addition to the Wi-Fi module and the wireless broadband module, may include wireless communication modules supporting various wireless communication methods such as a GSM (Global System for Mobile Communication), a CDMA (Code Division Multiple Access), a WCDMA (Wideband Code Division Multiple Access), a UMTS (Universal Mobile Telecommunications System), a TDMA (Time Division Multiple Access), and LTE (Long Term Evolution).

The chive devices 170 may include the braking device for generating braking force of a vehicle, a suspension for adjusting the damping of the vehicle, the power device for generating power of the vehicle and transmitting the power to the wheels, and the steering device for changing the running direction of the vehicle. The power device may include a power generating device for generating power and a power transmitting device for transmitting the generated power to the wheels.

Each of the components shown in FIG. 3 refers to hardware components such as software and/or a Field Programmable Gate Array (FPGA) and an Application Specific Integrated Circuit (ASIC).

The server 4 may be a server provided in a digital asset exchange, a service center that manages a plurality of vehicles, a manufacturer, an application developer and an application provider. The server 4 may also be a server with an application (i.e., an app) that provides a vehicle-linked service.

The server 4 may include a server of the center serving the group driving and a server of the digital asset exchange.

Figure 4:
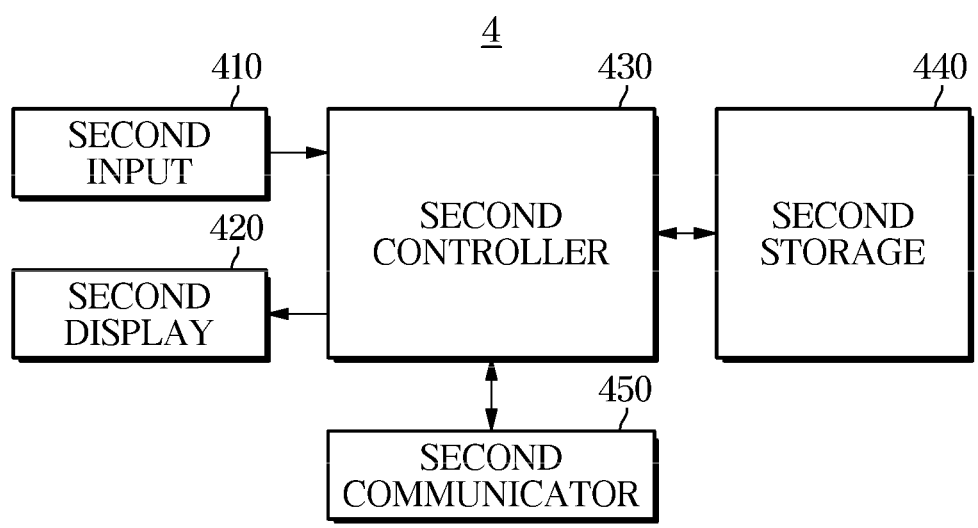
FIG. 4 is a control configuration diagram of a server communicating with the vehicles in one form of the present disclosure.

FIG. 4 is a control configuration diagram of the server 4 communicating with the vehicles 1 and 2 in some forms of the present disclosure.

The server 4 includes a second input 410, a second display 420, a second controller 430, a second storage 440, and a second communicator 450.

The second input 410 may receive update information of an application for providing a group driving service.

The second display 420 may display information of the vehicles using the group driving service and driver information of the vehicles, and may display error information of an application for providing the group driving service, update information of the application for providing the group driving service, and the like.

The second controller 430 confirms the group driving information of the own vehicle 1 when a request signal of the group driving service is received from the own vehicle 1, and searches the route from the current position of the own vehicle 1 to the destination and transmits the information of the searched route to the own vehicle 1 when it is determined that the own vehicle 1 has requested the leading mode. At this time, the second controller 430 may transmit the road situation information, the weather information, and the rest area information for each route along with the detected route information.

When the information of the selected route is received from the own vehicle 1, the second controller 430 may confirm the road situation information, weather information and rest area information of the received route and transmit the confirmed road situation information, weather information and rest area information.

The second controller 430 performs matching between the vehicles requesting the leading mode and the vehicles requesting the following mode based on the current position information, the destination information, and the departure time information, and transmits the information of the other vehicles to the matched vehicles.

The information of the other vehicle may include number information of the vehicle, vehicle type information, information of the driver of the vehicle, and the like.

The second controller 430 generates a group when the approval information is received from the matched vehicles, and at this time, requests payment of the cost of the following vehicle 2 in the group, transmits the information of the leading vehicle 1 to the following vehicle 2 when the cost is received from the following vehicle 2, and transmits the information of the following vehicle 1 to the leading vehicle 2.

The second controller 430 may receive the proposed cost from the leading vehicle 1, receive the proposed cost from the following vehicle 2, and guide the cost negotiation between the leading vehicle 1 and the following vehicle 2.

The second controller 430 may calculate the cost corresponding to the total driving distance and transmit the calculated cost to the leading vehicle 1 and the following vehicle 2.

When the approval rejection information is received from any one of the matched vehicles, the second controller 430 performs a new matching for providing the group driving service to the vehicle which rejects approval.

When the group driving mode between the leading vehicle and the following vehicles is completed, the second controller 430 receives the evaluation information of the leading vehicle 1 from the following vehicle 2, obtains the fuel efficiency based on the running distance and fuel consumption of the leading vehicle 1, generates the final evaluation information about the leading vehicle 1 based on the obtained fuel efficiency and the received evaluation information, and exchanges the cost corresponding to the generated final evaluation information with digital assets.

That is, the second controller 430 increases a holding amount of digital assets about the leading vehicle.

The second controller 430 may directly receive the fuel efficiency information from the leading vehicle.

When the leading vehicle 1 is a commercial vehicle such as a truck, the second controller 430 may receive information of loaded goods and obtain the fuel efficiency based on the received information of the loaded goods. The information of the loaded goods may include the type and weight of the loaded goods.

When the position information is received from the leading vehicle 1, the second controller 430 may confirm at least one of road situation information, weather information, and rest area information based on the received position information, and transmit at least one of the confirmed road situation information, weather information, and rest area information.

The second controller 430 may confirm the evaluation level corresponding to the evaluation information of the following vehicle 2, compare the fuel efficiency of the leading vehicle 1 with a reference fuel efficiency, raise the confirmed evaluation level when the fuel efficiency of the leading vehicle 1 is higher than the reference fuel efficiency, and reduce the confirmed evaluation level when the fuel efficiency of the leading vehicle 1 is lower than the reference fuel efficiency.

The second controller 430 may confirm the evaluation level corresponding to the final evaluation information.

The second controller 430 may pay the leading vehicle 1 the amount of money increased by a certain amount of money from a reference amount of money when the evaluation level of the leading vehicle 1 is equal to or higher than a reference level, and pay the leading vehicle 1 the amount of money increased by a certain amount of money from a reference amount of money when the evaluation level corresponding to the evaluation information is equal to or higher than the reference level.

The second controller 430 may pay the virtual money which is a digital asset to the following vehicle 2 based on whether or not the final evaluation information about the leading vehicle 1 is provided.

The second controller 430 may communicate with the server (nor shown) of the digital asset exchange to manage the digital assets of the driver of the leading vehicle 1 and the driver of the following vehicle 2.

The second controller 430 may transmit the content information to the following vehicle 2.

The second controller 430 may transmit the content information requested by the driver of the following vehicle 2 to the following vehicle 2.

The second controller 430 may transmit the cost information for the content information requested by the driver of the following vehicle 2 to the following vehicle 2, and may transmit the content information requested by the driver of the following vehicle 2 to the following vehicle 2 when the digital asset exchange information is received from the driver of the following vehicle 2.

The second controller 430 may receive the driving information between the starting position and the arrival position from the vehicle even when the group driving mode is not performed, and may provide the driver of the vehicle with the virtual money corresponding to the cost of the driving information provision.

The second controller 430 may collect vehicle big data by the driving of the vehicles by receiving the running speed, the pressing history of the brake pedal, the use of the in-vehicle additional devices, and the sensor use information of the electrical equipment of each vehicle.

The second controller 430 may pay the maintenance cost of the vehicle, the fueling cost, the toll charge, and the like with the virtual money in response to the request of the driver of the vehicle.

The second storage 440 stores the identification information of the vehicle using the group driving service, the digital asset holding amount of the driver of the vehicle, and the evaluation information of the driver of the vehicle, and stores the usage history of the group driving service of the vehicle driver's.

The identification information of the vehicle stored in the second storage 440 may be the information of the vehicle driver who requests and registers the use of the group driving service and may be the number information of the vehicle.

The second storage 440 may store usage schedule information of the group driving service of the vehicle driver.

The second storage 440 may store the identification information of the user terminal and the telephone number of the vehicle driver.

The second communicator 450 communicates with at least one of a plurality of vehicles using the group driving service through the infrastructure.

The second communicator 450 may perform communication with the user terminal (not shown). The second communicator 450 may transmit and receive information related to the group driving service to and from the user terminal (not shown).

The user terminal may be implemented as a computer or a portable terminal that may access a vehicle through a network. The computer may include, for example, a notebook, a desktop, a laptop, a tablet PC, a slate PC, and the like with a web browser (WEB Browser), and the portable terminal, which is a wireless communication device with guaranteed portability and mobility, may include all kinds of handheld based wireless communication devices such as a PCS (Personal Communication System), a GSM (Global System for Mobile communication), a PDC (Personal Digital Cellular), a PHS (Personal Handyphone System), a PDA (Personal Digital Assistant), an IMT (International Mobile Telecommunication)—2000, a COMA (Code Division Multiple Access)—2000, an W-CDMA (W-Code Division Multiple Access), an WiBro (Wireless Broadband Internet) terminal, and a smart phone, and wearable devices such as a watch, a ring, a bracelet, an anklet, a necklace, a pair of glasses, a contact lens, and a head-mounted device (HMD).

The server 4 may provide the group driving service between the vehicles, perform issuance and proof of transaction of the virtual money, which is a digital asset, and manage the liquidity, thereby increasing participation of the group driving service and improving security.

The server 4 may pay and receive the cost for the group driving service from the drivers of the vehicles with the virtual money so that the users who use the vehicles personally may use the group driving service.

Figure 5:
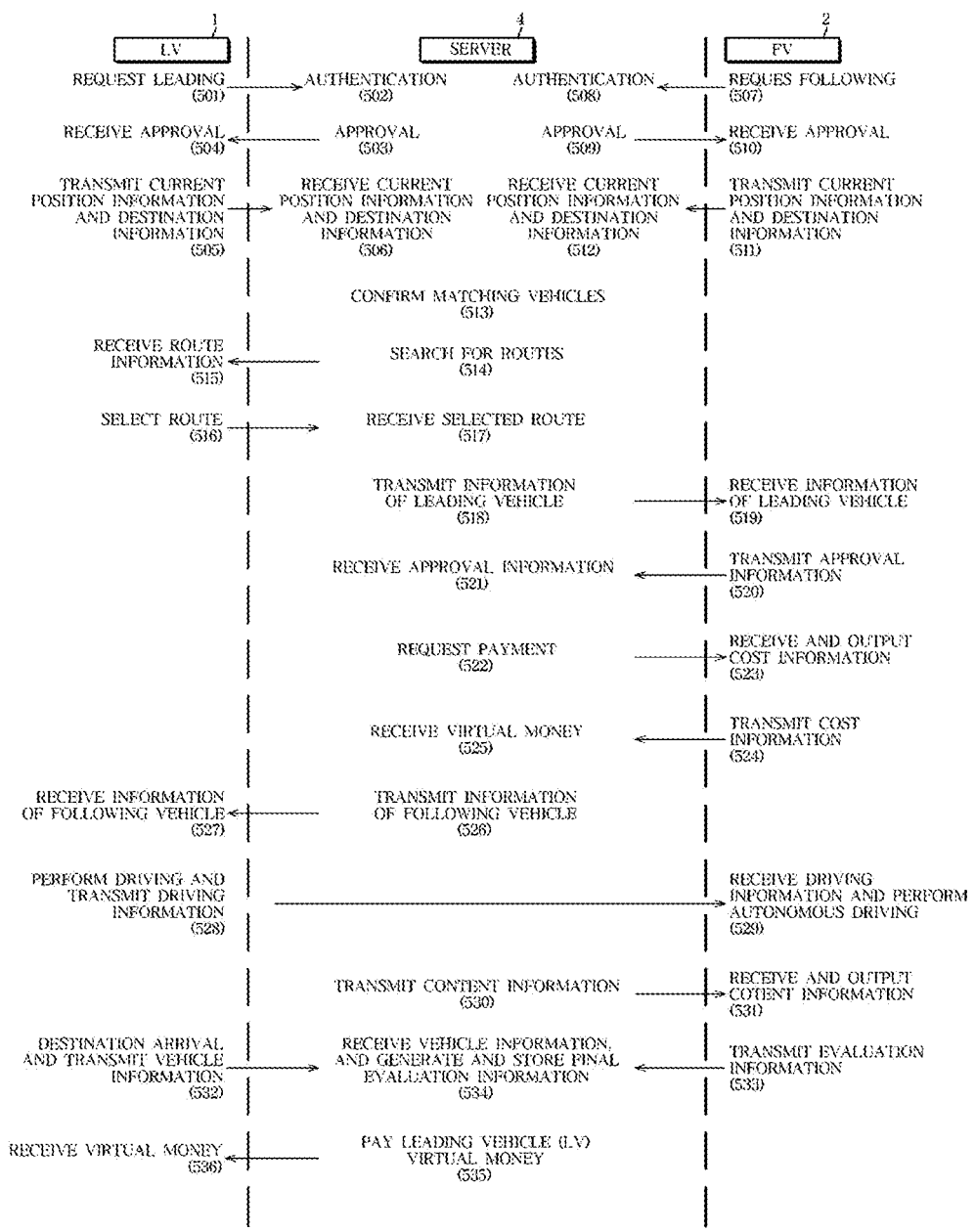
FIG. 5 is a control flowchart for a group driving mode of the vehicles in one form of the present disclosure.

FIG. 5 is a control flowchart for the group driving mode of the vehicles in some forms of the present disclosure.

Hereinafter, in describing the control of the group driving mode of the vehicles in some forms of the present disclosure, the exchange of the digital assets is described as payment of the virtual money and receipt of the virtual money.

The vehicles 1 and 2 may perform at least one of the leading mode and the following mode.

This flowchart describes an example in which the own vehicle 1 performs the leading mode and the other vehicle 2 performs the following mode.

The own vehicle 1 executes an application when the application for the group driving is selected.

The own vehicle 1 displays mode information on whether to execute the leading mode or the following mode when the group driving mode is selected by the application selection.

The own vehicle 1 may request the server 4 to drive as a leading vehicle when the leading mode is selected by the driver (501).

The server 4 confirms the identification information of the own vehicle 1 when the leading request information is received from the own vehicle 1, and performs authentication on whether the own vehicle 1 is a registered vehicle or a legitimate vehicle (502).

The server 4 transmits the approval information to the own vehicle 1 when it is determined that the own vehicle 1 is a registered vehicle and a legitimate vehicle (503), and requests the own vehicle 1 to register when it is determined that the own vehicle 1 is not a registered vehicle.

When the approval information is received from the server 4 (504), the own vehicle 1 confirms the current position, requests the driver to input information of the destination, and may further request the driver to input information such as a possible joining position, a way point and departure time, the type of cargo, and the number of the following vehicles.

The own vehicle 1 transmits the current position and destination information for performing the group driving mode to the server 4 (505).

As illustrated in FIG. 6A, the own vehicle 1 may display information of the group driving mode and transmit the information of the group driving mode to the server 4.

The information of the group driving mode may be information input by the driver, information detected by various detectors provided in the vehicle, and information previously stored in the vehicle.

When the information of the group driving mode including the current position information and the destination information is received from the own vehicle 1 (506), the server 4 may store the received information of the group driving mode.

The other vehicle 2 executes an application when the application for group driving is selected.

The other vehicle 2 displays mode information on whether to perform the leading mode or the following mode when the group driving mode is selected by the selection of an application.

The other vehicle 2 may request the server 4 to drive as the following vehicle when the following mode is selected by the driver (507).

The server 4 confirms the identification information of the other vehicle 2 when the following request information is received from the other vehicle 2, and performs authentication on whether the other vehicle 2 is a registered vehicle or a legitimate vehicle (508).

The server 4 transmits the approval information to the other vehicle 2 when it is determined that the other vehicle 2 is a registered vehicle and a legitimate vehicle (509), and requests the other vehicle 2 to register when it is determined that the other vehicle 2 is not a registered vehicle.

When the approval information is received from the server 4 (510), the other vehicle 2 confirms the current position, requests the driver to input information of the destination, and may further request the driver to input information such as a possible joining position, a movable distance for joining, a way point and departure time, the type of cargo, and the number of the following vehicles.

The other vehicle 2 may receive various kinds of information for performing the group driving mode.

The other vehicle 2 transmits the current position and destination information for performing the group driving mode to the server 4 (511).

As illustrated in FIG. 6B, the own vehicle 1 may display information of the group driving mode and transmit the information of the group driving mode to the server 4.

The information of the group driving mode may be information input by the driver, information detected by various detectors provided in the vehicle, and information previously stored in the vehicle.

When the information of the group driving mode including the current position information and the destination information is received from the other vehicle 2 (512), the server 4 may store the received information of the group driving mode.

The server 4 searches the leading vehicle 1 and at least one following vehicle 2 for group driving.

That is, the server 4 searches for the same or similar following vehicles as the leading vehicle 1 in the current position information, the destination information, and the departure time among the vehicles that request following, and matches the searched at least one following vehicle with the leading vehicle 1.

The server 4 confirms the following vehicle that matches the leading vehicle 1 (513).

The server 4 searches for a route based on the current position information and the destination information among the received information of the group driving mode (514), and transmits the information of the searched plurality of routes to the leading vehicle 1.

The information of the plurality of routes may include position information corresponding to the route, position information of the rest area in the route, road situation information, and weather information, and may further include information such as a running distance and estimated arrival time for each route.

When the information of the plurality of routes is received (515), the leading vehicle 1 controls display of the received information of the plurality of routes, and when any one route of the information of the plurality of routes is selected by the user (516), the leading vehicle 1 transmits the selected route information to the server 4.

When the route information selected by the leading vehicle 1 is received (517), the server 4 searches for the following vehicle 2 based on the received route information, and may match the leading vehicle 1 with the following vehicle 2.

The server 4 transmits information of the leading vehicle 1 to the following vehicle 2 (518). The information of the leading vehicle 1 may include the information of the number, the color, and the vehicle type of the leading vehicle 1, may further include driving habits information, and may further include fuel efficiency.

The server 4 transmits the information of the place (location) to meet the leading vehicle 1 to the following vehicle 2.

The following vehicle 2 displays received information of the leading vehicle 1 and the information of the meeting place when the information of the leading vehicle 1 is received (519), and transmits approval information to the server 4 when the approval information is received by the user (520).

When the approval information is received (521), the server 4 requests payment of the cost to the following vehicle 2 based on the running distance and the estimated arrival time (522).

The following vehicle 2 outputs received cost information through the display and the sound output when the cost information is received (523), and transmits payment information to the server 4 when the payment instruction is received (524).

When the payment information is received from the following vehicle 2, the server 4 receives the virtual money of the driver of the following vehicle 2 (525) and pays the received virtual money to the leading vehicle 1.

That is, the server 4 subtracts the cost for the group driving service from the virtual money of the driver of the following vehicle 2, and adds the cost for the group driving service to the virtual money of the driver of the leading vehicle 1.

The server 4 transmits the information of the following vehicle 2 to the leading vehicle 1 (526). The information of the following vehicle 2 may include the information of the number, the color, and the vehicle type of the following vehicle 2, may further include driving habits information, and may further include fuel efficiency.

The server 4 transmits information of the place (location) to meet the following vehicle 2 to the leading vehicle 1.

The leading vehicle 1 displays received information of the following vehicle 2 and the information of the meeting place when the information of the following vehicle 2 is received (527), and may transmit approval information to the server 4 when the approval information is received by the user.

The leading vehicle 1 travels to the place promised to meet the following vehicle 2, determines that the leading vehicle 1 is located close to the following vehicle 2 when an arrival signal is received from the following vehicle 2, and starts traveling to the destination.

The leading vehicle 1 may determine that it is located close to the following vehicle 2 when it may communicate with the following vehicle 2.

The leading vehicle 1 transmits driving information to the following vehicle 2 while performing the driving (528).

That is, the leading vehicle 1 may transmit acceleration information, deceleration information, stop information, direction information, speed information, and the like to the following vehicle 2.

The leading vehicle 1 may receive state information of the following vehicle 2 in real time or periodically from the server 4 or the following vehicle 2, maintain the running when the state of the following vehicle 2 is normal, and request maintenance or pause of the group driving mode when it is determined that the state of the following vehicle 2 is abnormal.

The following vehicle 2 performs autonomous driving based on the driving information transmitted from the leading vehicle 1 (529), monitors the state information, and transmits the monitored state information to the server 4 or the leading vehicle 1 in real time or periodically.

The server 4 transmits the content information to the following vehicle 2 (530). At this time, the server 4 may recommend the content preferred by the driver of the following vehicle 2.

When the content information is received, the following vehicle 2 outputs the received content information (531).

The outputting of the content information may include reproducing at least one of a movie, a music, a news, a broadcast, an advertisement, and a lecture through the vehicle terminal, and outputting shopping information and Internet information.

The leading vehicle 1 may receive road situation information, weather information, and location information of a rest area from the server 4 and control the output of the received information.

When the route is changed, the leading vehicle 1 may transmit the information of the changed route to the server 4 or to the following vehicle 2.

When it is determined that the leading vehicle 1 has arrived at the destination, the leading vehicle 1 transmits the driving information from the starting point to the destination to the server 4, and transmits the pressing information of the brake pedal 122, the pressing information of the accelerator pedal 123, and the fuel efficiency to the server 4 (532).

When it is determined that the following vehicle 2 has also arrived at the destination, the following vehicle 2 outputs an evaluation list for evaluating the leading vehicle 1 and transmits the evaluation information inputted by the driver to the server 4.

Also, when it is determined that the following vehicle 2 has arrived at the destination, the following vehicle 2 may transmit the driving information and fuel efficiency information from the starting point to the destination to the server 4 (533).

When the vehicle information is received from the leading vehicle 1 and the following vehicle 2 and the evaluation information is received from the following vehicle 2, the server 4 generates final evaluation information for the leading vehicle 1 and stores the generated final evaluation information (534).

The server 4 confirms the evaluation level corresponding to the final evaluation information and may further pay the virtual money to the leading vehicle 1 based on the confirmed evaluation level (535).

That is, the server 4 may add up the cost paid by the following vehicle 2 and the cost corresponding to the evaluation information evaluated by the following vehicle 2 to pay the leading vehicle 1 the virtual money.

At this time, the leading vehicle 1 may receive the virtual money (536). The receiving of the virtual money may include increasing the holding amount of digital assets managed in the server 4.

Examples of the group driving between vehicles and payment of the group driving service will be described with reference to FIGS. 7 to 9.

Figure 7:
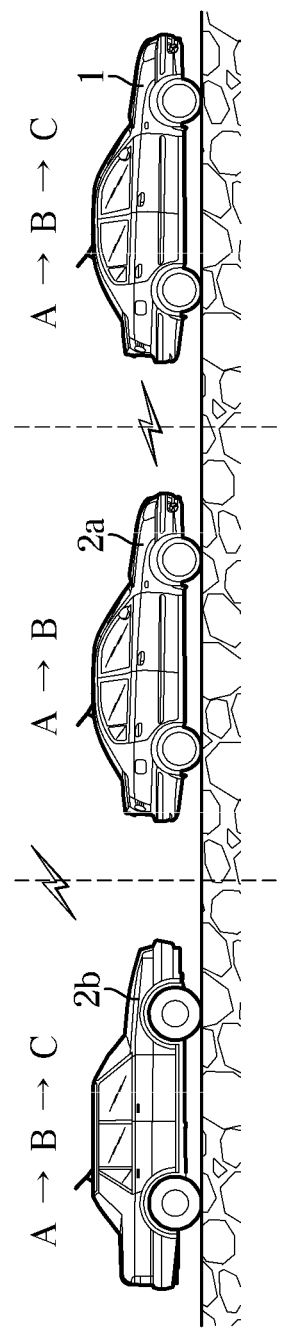
FIGS. 7, 8 and 9 illustrate exemplary group driving of the vehicles in one form of the present disclosure.

As illustrated in FIG. 7, when the leading vehicle 1 travels from a departure point A to a destination C via a way point B, the first following vehicle 2a may perform the group driving from the departure point A to the way point B, and the second following vehicle 2b may perform the group driving from the departure point A to the destination C via the way point B together.

At this time, the first following vehicle 2a may pay the leading vehicle 1 the cost for the group driving service from the departure point A to the way point B with the virtual money, and the second following vehicle 2b may pay the leading vehicle 1 the cost for the group driving service from the departure point A to the destination C via the way point B together with the virtual money.

That is, the leading vehicle 1 may travel from the departure point A to the destination C via the way point B and receive the cost for the group driving service from the first and second following vehicles 2a and 2b with the virtual money, respectively.

Further, the leading vehicle 1 may further receive the virtual money from the server 4 in accordance with the fuel efficiency of the leading vehicle 1 and the evaluation information evaluated by the drivers of the first following vehicle 2a and the second following vehicle 2b.

The first following vehicle 2a and the second following vehicle 2b may also receive the virtual money from the server 4 as a compensation for providing the evaluation information on the leading vehicle 1.

Figure 8:
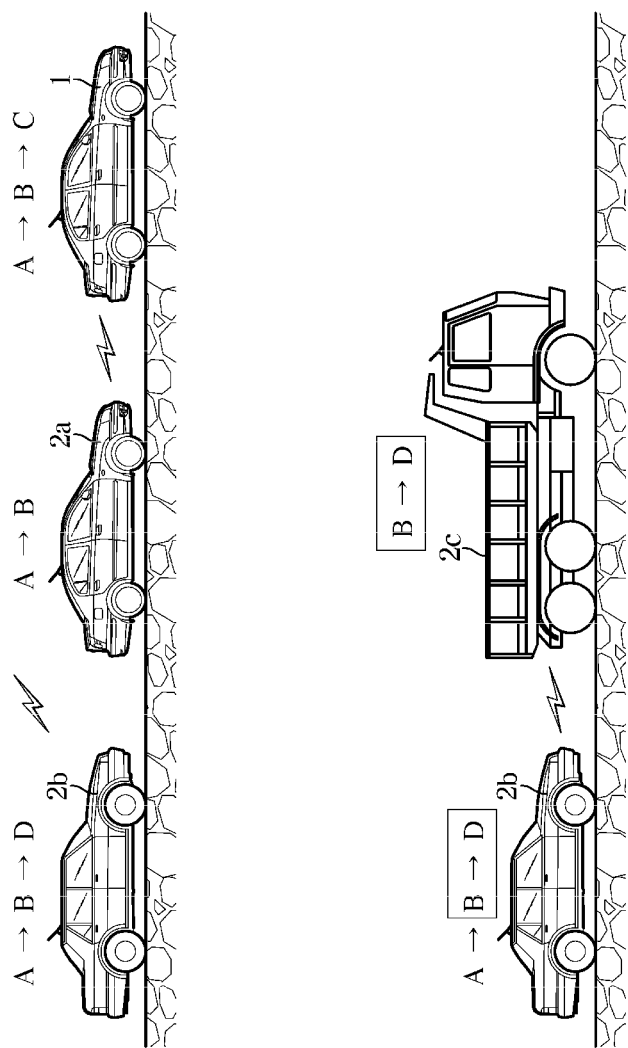

As illustrated in FIG. 8, when it is assumed that the leading vehicle 1 travels from the departure point A to the destination C via the way point B, the first following vehicle 2a travels from the departure point A to the way point B, and the second following vehicle 2b travels from the departure point A to a destination point D via the way point B, the first following vehicle 2a and the second following vehicle 2b may travel may perform the group driving from the departure point A to the way point B.

Also, the first following vehicle 2a and the second following vehicle 2b may pay the leading vehicle 1 the cost for the group driving service from the departure point A to the way point B with the virtual money. At this time, the leading vehicle 1 may receive the cost for traveling from the departure point A to the way point B from the first and second following vehicles 2a and 2b with the virtual money, respectively.

Further, the leading vehicle 1 may further receive the virtual money from the server 4 in accordance with the fuel efficiency of the leading vehicle 1 and the evaluation information evaluated by the drivers of the first following vehicle 2a and the second following vehicle 2b.

The first following vehicle 2a and the second following vehicle 2b may also receive the virtual money from the server 4 as a compensation for providing the evaluation information on the leading vehicle 1.

The second following vehicle 2b may follow the new leading vehicle 2c at the way point B to perform the group driving to the destination D.

Also, the second following vehicle 2b may pay the leading vehicle 2c the cost for the group driving service from the way point B to the destination D with the virtual money. At this time, the leading vehicle 2c may receive the cost for traveling from the way point B to the destination D from the second following vehicle 2b with the virtual money.

Further, the leading vehicle 2c may further receive the virtual money from the server 4 in accordance with the fuel efficiency of the leading vehicle 2c and the evaluation information evaluated by the driver of the second following vehicle 2b.

The second following vehicle 2b may also receive the virtual money from the server 4 as a compensation for providing the evaluation information on the leading vehicle 2c.

As such, the vehicle may perform the group driving while following the other leading vehicle at the way point during performing the running, pay for all leading vehicles with the virtual money when the leading vehicle is changed, and receive compensation costs with the virtual money by performing an evaluation on all the leading vehicles.

Figure 9:
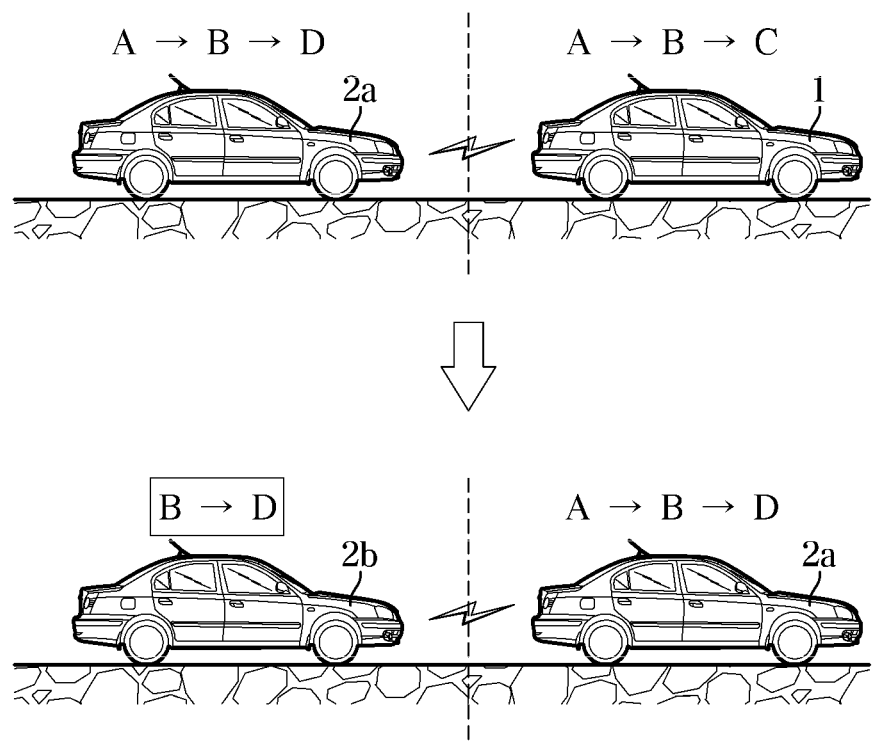

As illustrated in FIG. 9, when it is assumed that the leading vehicle 1 travels from the departure point A to the destination C via the way point B and the first following vehicle 2a travels from the departure point A to the destination point D via the way point B, the first following vehicle 2a may travel may perform the group driving from the departure point A to the way point B.

Also, the first following vehicle 2a may pay the leading vehicle 1 the cost for the group driving service from the departure point A to the way point B with the virtual money. At this time, the leading vehicle 1 may receive the cost for traveling from the departure point A to the way point B from the first following vehicle 2a with the virtual money.

Further, the leading vehicle 1 may further receive the virtual money from the server 4 in accordance with the fuel efficiency of the leading vehicle 1 and the evaluation information evaluated by the driver of the first following vehicle 2a.

The first following vehicle 2a may also receive the virtual money from the server 4 as a compensation for providing the evaluation information on the leading vehicle 1.

The first following vehicle 2a may be changed to the leading mode at the transit point B. At this time, the function of the first following vehicle 2a may be changed to the leading vehicle.

The leading vehicle 2a may perform manual traveling from the way point B to the destination D.

At this time, the new second following vehicle 2b may follow the leading vehicle 2a at the way point B to perform the group driving to the destination D.

Also, the second following vehicle 2b may pay the leading vehicle 2a the cost for the group driving service from the way point B to the destination D with the virtual money. At this time, the leading vehicle 2a may receive the cost for traveling from the way point B to the destination D from the second following vehicle 2b with the virtual money.

Further, the leading vehicle 2a may further receive the virtual money from the server 4 in accordance with the fuel efficiency of the leading vehicle 2a and the evaluation information evaluated by the driver of the second following vehicle 2b.

The second following vehicle 2b may also receive the virtual money from the server 4 as a compensation for providing the evaluation information on the leading vehicle 2a.

As such, the vehicle may change the mode at the way point while performing the running. That is, the vehicle may be changed from the leading mode to the following mode or from the following mode to the leading mode during the group driving mode.

Some forms of the present disclosure may be implemented in the form of a recording medium storing instructions executable by a computer. The instructions may be stored in the form of program code, and when executed by a processor, a program module may be created to perform the operations of some forms of the present disclosure. The recording medium may be implemented as a computer-readable recording medium.

The computer-readable recording medium includes all kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, the present disclosure can utilize a group driving service using an application of a terminal provided in a vehicle, so that users of passenger cars and commercial vehicles, that is, individual users may easily and conveniently use the group driving service.

The present disclosure can pay the service providing cost to a driver of a leading vehicle responsible for actual driving during the group driving using virtual money and receive the service use cost from a driver of a following vehicle following the leading vehicle using virtual money, so that the group driving service may be used smoothly through a virtual money payment system.

That is, the present disclosure can secure reliability and stability using a block chain-based transaction method.

The present disclosure can allow a server to provide vehicle information obtained while performing the group driving, so that driving-related information and vehicle information for autonomous driving which is essential for group driving may be easily obtained.

The present disclosure can output content information such as movies, shopping, music, and the like provided from the server when in a following mode during the group driving, so that a user may be provided with a fun and useful time and an environment for resting the user may be created.

The present disclosure can provide new services such as maintenance, fueling, and tollgate cost through expansion of the utilization area of virtual money and can conclude and implement various types of smart contracts such as financial transactions based on block chaining, real estate contracts, and notarization.

The present disclosure can improve the fuel efficiency of the following vehicle by reducing the air resistance of the following vehicle when performing the group driving, reduce the risk of accidents, and improve the rest and convenience of the user of each vehicle.

The present disclosure can recommend the route based on the route information to the destination and the fuel efficiency information for each route, thereby enabling the driver to select a route that is helpful for improving fuel efficiency.

Therefore, the present disclosure can allow the driver to select the route for improving the fuel efficiency, so that the fuel cost and the fuel consumption may be reduced, thereby minimizing the environmental problem.

The present disclosure can provide a block-chain-based service by providing a group driving platform even to individual users and can make a comfortable and efficient group driving.

As such, the present disclosure can improve the quality and merchantability of a vehicle, further increase the satisfaction of a user, and secure the competitiveness of a product.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
    a user input device;
    a communicator configured to communicate with a server and a second vehicle;
    a storage configured to store an application for a group driving mode where a group of vehicles includes the second vehicle; and
    a controller configured to:
        control the application when the group driving mode is selected; and
        exchange compensation for a service corresponding to the group driving mode with digital assets through the server; and
        in response to the vehicle being in a following mode, determine whether the group driving mode has been deactivated, output an evaluation list for evaluating a leading vehicle when it is determined that the group driving mode has been deactivated, receive evaluation information of the leading vehicle corresponding to the evaluation list received by the user input device, and control the communicator to transmit the evaluation information to the server, wherein the evaluation information is information for determining an exchange amount of the digital assets to be paid to the leading vehicle and includes driving habits and driving safety about the leading vehicle.

2. The vehicle of claim 1, wherein the vehicle further comprises:
a fuel amount detector configured to detect a fuel amount; and
a speed detector configured to detect a driving speed,
wherein the controller is further configured to:
obtain a distance based on the detected driving speed from a starting point to a destination point when the group driving mode is selected;
obtain a fuel efficiency based on the obtained distance and the detected fuel amount; and
transmit, to the server, the obtained fuel efficiency in a leading mode, wherein the obtained fuel efficiency is configured to determine the exchange amount of the digital assets.

3. The vehicle of claim 1, wherein the vehicle further comprises:
a display; and
a sound output,
wherein the controller is further configured to:
transmit, to the server, route information from a starting point to a destination point when the group driving mode is selected;
receive, from the server, external information including at least one of road information, weather information or rest area information corresponding to the route information in a leading mode; and
control at least one of the display or the sound output to output the received external information.

4. The vehicle of claim 1, wherein the vehicle further comprises:
a first pressing detector configured to detect a first pressure applied to a brake pedal;
a second pressing detector configured to detect a second pressure applied to an accelerator pedal;
a steering angle detector configured to detect a steering angle of a steering wheel;
a braking device;
a power device; and a steering device,
wherein the controller is configured to control, in a leading mode, at least one of the braking device, the power device or the steering device based on the detected first pressure, the detected second pressure and the detected steering angle.

5. The vehicle of claim 1, wherein the vehicle further comprises:
an image obtainer configured to obtain an image of a road; and
a distance detector configured to detect a distance to an obstacle,
wherein the controller is configured to control, in the following mode, an autonomous driving based on the image of the road, the distance to the obstacle and driving information transmitted from the leading vehicle.

6. The vehicle of claim 5, wherein the vehicle further comprises:
a display; and
a sound output,
wherein the controller is configured to:
receive, in the following mode, leading vehicle information from the server;
control at least one of the display or the sound output to output the leading vehicle information; and
control the communicator to transmit approval information to the server when the approval information is received through the user input device,
wherein the approval information is configured to perform the group driving with the leading vehicle, and
wherein the leading vehicle information comprises identification information of the leading vehicle and the evaluation information of the leading vehicle stored in the server.

7. The vehicle of claim 5, wherein the vehicle further comprises:
a display; and
a sound output,
wherein the controller is configured to:
receive, in the following mode, content information from the server; and
control at least one of the display or the sound output to output the received content information.

8. A server comprising:
a communicator configured to communicate with a plurality of vehicles;
a memory, an application for a group driving mode being stored in the memory; and
a controller configured to:
transmit, to the plurality of vehicles, the application for the group driving mode;
manage digital assets of drivers of the plurality of vehicles that use the application in the memory;
control the memory to store evaluation information of a leading vehicle when evaluation information of the leading vehicle is received from a following vehicle, wherein the evaluation information is configured to determine an exchange amount of the digital assets and includes information on driving habits and driving safety about the leading vehicle received from the following vehicle; and
control the exchange of digital assets between the leading vehicle and the following vehicle so that an increase in the digital assets is provided to the leading vehicle based on the evaluation information.

9. The server of claim 8, wherein the controller is configured to:
match the leading vehicle and the following vehicle based on information of a starting point and destination point of the leading vehicle requesting the group driving mode;
transmit, to the leading vehicle, information of the following vehicle; and
transmit, to the following vehicle, information of the leading vehicle.

10. The server of claim 9, wherein the controller is configured to:
search for a plurality of routes based on the information of the starting point and the information of the destination point when the information of the starting point and the information of the destination point are received from the leading vehicle; and
control the communicator to transmit the plurality of routes to the leading vehicle.

11. The server of claim 9, wherein the controller is configured to:

confirm, when position information is received from the leading vehicle, at least one of road information, weather information or rest area information based on the position information; and control the communicator to transmit at least one of the road information, the weather information, or the rest area information.

12. The server of claim 9, wherein the controller is configured to:

obtain, when a distance from the starting point to the destination point and a change amount of fuel are received from the leading vehicle, a fuel efficiency of the leading vehicle based on the distance and the change amount of the fuel; and determine the exchange amount of the digital assets based on the fuel efficiency.

13. The server of claim 9, wherein the controller is configured to:

receive a fuel efficiency and the evaluation information from the following vehicle;

generate final evaluation information of the leading vehicle based on the fuel efficiency and the evaluation information; and determine the exchange amount of the digital assets corresponding to the final evaluation information.

14. The server of claim 9, wherein the controller is configured to:

receive driving information from the leading vehicle and the following vehicle when the group driving mode is completed; and store the driving information to the memory.

15. A method for controlling a vehicle to communicate with a server and a second vehicle, the method comprising:

transmitting, to the server, leading request information, information of a starting point, and information of a destination point when a leading mode is selected in a group driving mode;

transmitting, to the server, information regarding a plurality of routes when information regarding the plurality of routes is received from the server;

performing a manual driving while communicating with a following vehicle when following vehicle information is received from the server;

adjusting digital assets of the following vehicle through the server when the group driving mode is deactivated;

transmitting, to the server, following request information, the information of the starting point, and the information of the destination point when a following mode is selected in the group driving mode;

performing an autonomous driving while communicating with a leading vehicle when leading vehicle information is received from the server;

adjusting digital assets of the leading vehicle through the server when the group driving mode is deactivated;

outputting an evaluation list for evaluating the leading vehicle when the group driving mode is deactivated;

receiving evaluation information of the leading vehicle corresponding to the evaluation list received by an input;

controlling a communicator to transmit the evaluation information to the server; and receiving, from the server, digital assets corresponding to the evaluation information, wherein the evaluation information is configured to determine an exchange amount of the digital assets, and include information on driving habits and driving safety about the leading vehicle.

16. The method of claim 15, wherein the method further comprises:

obtaining a distance based on a driving speed from the starting point to the destination point when the group driving mode is performed;

obtaining a fuel efficiency based on the distance and a fuel amount;

transmitting, to the server, the fuel efficiency in the leading mode; and receiving, from the server, digital assets corresponding to the fuel efficiency.

17. The method of claim 15, wherein the method further comprises:

receiving, from the server, at least one of road information, weather information, or rest area information corresponding to a selected route in the leading mode; and outputting the at least one of the road information, the weather information, or the rest area information through at least one of a display or a sound output.

* * * * *